United States Patent [19]

Boyce

[11] Patent Number: 4,669,495

[45] Date of Patent: Jun. 2, 1987

[54] ADJUSTABLE FLOW REGULATING VALVE

[75] Inventor: Donald A. Boyce, Chesterland, Ohio

[73] Assignee: Fluid Controls, Inc., Racine, Wis.

[21] Appl. No.: 816,326

[22] Filed: Jan. 6, 1986

[51] Int. Cl.⁴ ............... G05D 7/01; F16K 31/363
[52] U.S. Cl. ................... 137/117; 137/504; 251/120
[58] Field of Search ............ 251/120; 137/117, 115, 137/504; 411/402

[56] References Cited

U.S. PATENT DOCUMENTS

| 2,271,047 | 1/1942 | Sloan . | |
|---|---|---|---|
| 2,843,141 | 7/1958 | Arnot et al. | 137/117 |
| 2,859,762 | 11/1958 | Banker | 137/115 X |
| 2,882,922 | 4/1959 | Schindel . | |
| 3,331,267 | 7/1967 | Tietge | 81/121.1 |
| 3,464,439 | 9/1969 | Budzich | 137/504 |
| 3,677,287 | 7/1972 | Morris . | |
| 3,818,927 | 6/1974 | Zeuner . | |
| 3,903,919 | 9/1975 | Zeuner . | |
| 3,905,575 | 9/1975 | Zeuner et al. . | |
| 3,977,649 | 8/1976 | Zeuner et al. . | |
| 4,305,566 | 12/1981 | Grawunde . | |
| 4,383,552 | 5/1983 | Baker | 137/504 |

FOREIGN PATENT DOCUMENTS

| 1015654 | 9/1957 | Fed. Rep. of Germany | 137/115 |
|---|---|---|---|
| 250165 | 6/1948 | Switzerland | 137/117 |

OTHER PUBLICATIONS

Paper entitled "Solenoid Operated Cartridge Valves", by Wayland A. Tenkku.

Primary Examiner—Martin P. Schwadron
Assistant Examiner—Stephen M. Hepperle
Attorney, Agent, or Firm—Peter N. Jansson

[57] ABSTRACT

A flow regulating cartridge assembly that can be adjusted from substantially zero flow to a predetermined maximum flow determined by the maximum size of a flow controlling orifice located within the valve assembly. The valve includes a spool slidably mounted within a step bore located in the valve body which is operative to control the fluid communication between an inlet port and a bypass port. The spool includes an adjustable orifice for adjusting a regulated fluid flow through a regulated port. The spool member threadedly carries an adjustment stem which includes a tapered end that is adapted to move into and out of the orifice to adjust its effective orifice size. A coupling member including an adjustment segment extending externally of the valve body includes a coupling arrangement which allows relative axial movement between the adjustment stem and the coupling member but prevents relative rotation. The coupling member includes a hexagonally shaped cavity which receives a complementally shaped head forming part of the stem. Rotation of the adjustment segment from outside the valve body produces attendant rotation in the adjustment stem thus changing the effective orifice size and hence the regulated flow rate.

10 Claims, 3 Drawing Figures

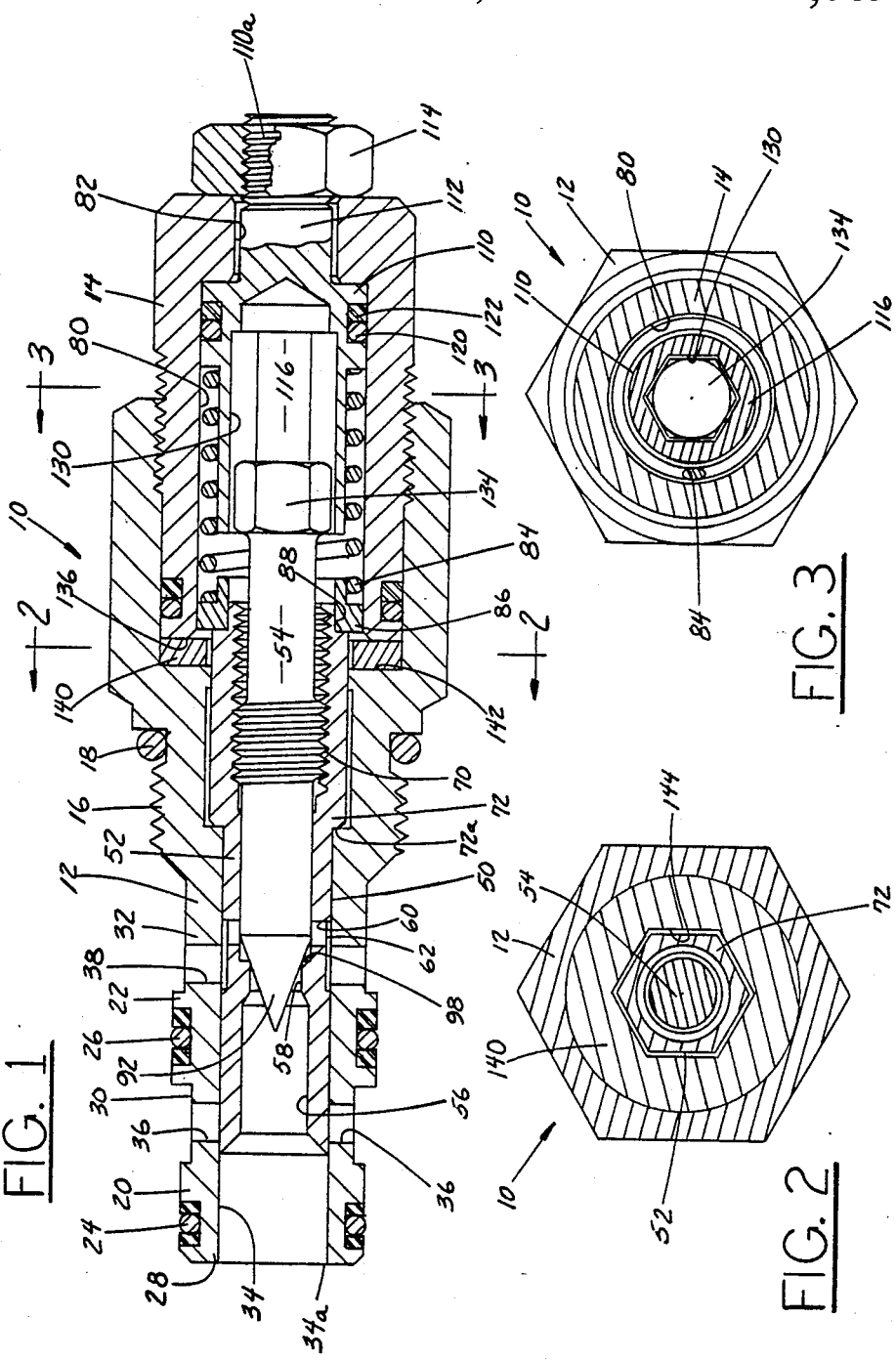

ADJUSTABLE FLOW REGULATING VALVE

DESCRIPTION

1. Technical Field

The present invention relates generally to control valves and in particular to a flow regulating cartridge valve.

2. Background Art

Flow regulating valves have many uses today. In general, valves of this type are intended to provide a controlled or regulated flow rate regardless of changes in inlet pressure. In many regulating type valves, the regulation is achieved by a valve element having an orifice through which the regulated flow must pass. As the flow changes, the pressure drop across the orifice varies accordingly and exerts a biasing force on the element. The valve element in turn controls the communication of an inlet port with a by-pass port. As the pressure drop across the orifice increases with increasing inlet pressure, the valve element communicates the inlet with the by-pass port to exhaust the excess fluid.

In the past, valves of this type have been constructed in which the regulated flow rate was adjustable. In general, these valves were rather complex and were not easily replaced in a fluid system.

With today's trend toward modularity, easily replaceable cartridge valves are highly desirable. A cartridge valve typically contains regulating components within a valve body. The body itself is threadedly mounted in a cavity or housing. When the cartridge valve is seated, ports formed in the housing communicate with associated fluid passages defined by the valve body.

Flow regulating cartridge valves are available. In general, however, the flow rates are not easily adjustable. In some case, minimal adjustment of the regulated flow rate can be achieved by adjusting the spring biasing force on the control element. In most circumstances, when significant changes in the controlled flow rate are desired, the cartridge valve assembly must be replaced with one having the desired flow characteristics.

DISCLOSURE OF THE INVENTION

The present invention provides a new and improved flow regulating cartridge valve in which the regulated flow rate for the valve can be adjusted from substantially zero to a maximum fluid rate determined by the maximum size of a flow controlling orifice.

In a preferred and illustrated embodiment, the cartridge valve assembly includes a valve body defining an inlet, a by-pass port and a regulated port. The housing slidably receives a spool assembly which is operative to control the communication of the inlet with the by-pass port in order to maintain a predetermined flow rate at the regulated port.

The spool assembly includes a spool member defining an orifice for communicating the inlet with the regulated port. The spool member carries a stem which coacts with the orifice to provide a variable effective orifice size for the orifice. According to the invention, the stem moves with the spool member but is manipulable from outside the valve body.

According to a feature of the invention, the stem is threadedly received by the spool member and includes a tapered section, preferably at one end, which is aligned with the orifice and which moves in and out of the orifice depending on the direction of rotation of the stem. Rotating the stem in one direction causes the tapered section to move into the orifice thus reducing its effective size. Rotation in the opposite direction moves the section out of the orifice thus increasing its effective size.

Since the effective orifice size determines the regulative flow rate, the flow rate can be varied between zero and a predetermined maximum determined by the maximum orifice size. In the preferred embodiment, the maximum orifice size is reached when the stem is rotated until the tapered section moves out of the orifice entirely.

According to a feature of the invention, the stem is rotated from outside the valve body by a coupling member that includes structure extending externally of the valve body and a coupling member connected to the structure and located within said housing.

In the exemplary embodiment, the stem includes structure engageable by the coupling member which allows relative sliding movement between the stem and member but inhibits relative rotative movement. With this construction, rotation of the external structure produces rotation in the stem thus changing the effective orifice size. In the preferred construction, the coupling member includes a polygonally shaped socket which slidingly receives a complementally shaped structure located at one end of the stem. In a more preferred embodiment, the socket is hexagonal shaped in cross section and the structure on the stem comprises a hexagonally shaped head.

The engagement between the stem structure and the coupling member socket allows the spool assembly to move in response to changes in inlet pressure to change the communication between the inlet and the by-pass port but yet allows the stem to be rotated from outside the valve body.

In the illustrated embodiment, the engagement between the hexagonal head and the coupling member socket is achieved in a spring chamber formed between two valve body members that comprise the overall valve body. The spring biases the spool assembly towards a position at which communication between the inlet and the by-pass port is interrupted. As the pressure drop across the orifice increases, the spring force is countered by the pressure exerted on the spool member eventually communicating the inlet with the by-pass port whereupon excess fluid is discharged.

According to another feature of the invention, relative rotation between the spool assembly and the valve housing is inhibited. In the preferred embodiment, the spool member includes a segment that is polygonally shaped in cross section. In turn, the housing includes structure having a complementally shaped aperture through which the segment slides. Although the housing structure prevents relative rotation, it does not inhibit reciprocal movement in the spool assembly. In a more preferred construction, the structure comprises a washer-like element including a hexagonal aperture that is rigidly clamped between two valve body members.

Additional features of the invention will become apparent and a fuller understanding obtained by reading the following detailed description made in connection with the accompanying drawings.

BRIEF DESCRIPTION OF DRAWINGS

FIG. 1 is a sectional view of a cartridge valve assembly embodying the present invention;

FIG. 2 is a sectional view of the valve assembly as seen from the plane indicated by the line 2—2 in FIG. 1; and FIG. 3 is a sectional view of the valve assembly as seen from the plane indicated by the line 3—3 in FIG. 1.

BEST MODE FOR CARRYING OUT THE INVENTION

FIG. 1 illustrates the overall construction of an adjustable flow regulating cartridge valve, embodying the present invention. The valve includes a valve body (or "cartridge") 10 comprising a first body member 12 and a second body member 14 threadedly received by the first body member.

The body member 12, as is conventional, is designed to be threaded into a cavity formed in a valve housing (not shown). A threaded segment 16 and a seal 18 are provided for this purpose.

The body member 12 also includes lands 20, 22 which mount sealing elements 24, 26 which sealingly engage structure formed on the inside of the housing cavity (not shown) and served to isolate body portions 28, 30 and 32 from each other. The body member 12 defines a stepped through bore 34. An end opening 34a of the bore 34 defines a fluid inlet to the valve. A plurality of radial passages 36 formed in the body portion 30 communicate with the bore 34 and define fluid by-pass ports. A plurality of passages 38, formed in the body portion 32 open into the bore 34 and define regulated ports.

A spool assembly 50 is slidably supported within the bore 34 and controls the communication of fluid from the inlet 34a to the by-pass port 30 and the regulated ports 38.

The spool assembly 50 includes a tubular spool member 52 and an adjustment stem 54. The spool member 52 defines a multi-step through bore 56. At one point, the bore 56 narrows and defines an orifice 58. Just to the right of the orifice 58 (as viewed in FIG. 1), radially extending passages 60 are formed which communicate the valve body bore 34 with the spool member bore 56. An annular groove 62 is defined by the spool member 52 and provides a clearance region between the spool member 52 and the bore 34 in order to fluidly communicate the radially passages 60 formed in the spool member 52 with the radial passages 38 formed in the body member 12. As you proceed rightwardly along the spool member bore 56, the bore diameter expands and includes a threaded segment 70. The spool member 52 includes an enlarged diameter section 72 which defines an abutment shoulder 72a. The shoulder 72a coacts with a stepped portion in the body bore 34 and defines the left most position for the spool member 52.

As indicated earlier, the second body member 14 is threadedly received by the first body member 12. The body member 14 includes a stepped through bore including an enlarged diameter portion 80 and a narrow diameter portion 82. The bore portion 80 defines a spring chamber housing a spring 84 which exerts a biasing force on the spool member 52 urging it towards the left, as view in FIG. 1, i.e., towards a position in which the inlet 34 is isolated from the radial ports 36. The spring force is applied by the spring 84 to the spool member 52 via a spring seat 86 which rests on and is located by a reduced diameter section 88 formed on the spool member 52.

The stem 54 includes a threaded segment 90 which threadedly engages the internally threaded segment 70 formed on the spool member 52. The stem also includes a tapered or conical end portion 92 formed on the left end of the stem (as viewed in FIG. 1). The rotation of the stem causes the tapered section 92 to move towards and away from an orifice seat 98 depending on the direction of rotation. As the tapered end moves into the orifice 58, the effective size of the orifice decreases. The coaction between the seat 98 and the tapered end 92 provides a variable orifice size.

According to the invention, although the stem 54 is located entirely within the cartridge valve 10, its position within the spool member 52 can be modified from outside of the valve. To achieve this feature, an adjustment member 110 is rotatably carried by the body member 14. The adjusting member 110 includes a narrow, rod-like segment 112 which extends through the bore 80 formed in the body member 14. The segment 112 includes a threaded portion 112a which is adapted to receive a locking nut 114 by which the rotative position of the member 110 is fixed. The member 110 also includes a socket or coupling member 116 located within the spring chamber 80. A seal assembly 120 is fitted within a groove 122 formed in the socket and sealingly engages the inside of the bore 82 to inhibit fluid leakage through the bore 80.

The socket member defines an internal cavity 130 which is preferably hexagonal in cross section. The socket member 116 slidably receives structure 134 on the stem 54, which in the preferred embodiment is complementally shaped and hence is also hexagonal in cross section. The rotational axis of the stem 54 is substantially coincident with the axis of the adjustment member 110. As seen in FIG. 1, the hexagonal head formed on the stem 54 is dimensionally smaller than the cavity so that relatively sliding movement between the stem and the socket 116 can be accommodated. The hexagonal cross sections however cause the stem 54 and the socket 116 to be rotationaly coupled so that rotation of the member 110 produces attendant rotation in the stem 54.

To facilitate rotation, the narrow diameter segment 112 may include a hex key cavity or other structure to facilitate manipulation of the stem 112.

With the preferred construction, the lock nut is removed or loosened and the stem 112 is rotated to change the effective orifice size defined between the orifice 58 and the tapered end portion 92 of the stem 54. As is known, the size of the orifice determines the pressure drop across the orifice and thus determines the flow rate from the inlet to the radial passages 38. For a given orifice size, as the fluid flow increases, the pressure drop also increases thus increasing the biasing force on the spool member 52 tending to urge it towards the right, as viewed in FIG. 1, counteracting the spring force exherted by the spring 84. When a sufficient biasing force is generated, the spool member 52 exposes the radially passages 36 allowing inlet fluid to by-pass the regulated flow passages 38, thus reducing inlet pressure. The extent to which the passages 36 are exposed is determined by inlet pressure. The greater the pressure, the larger the flow through the by-pass ports 36. As a result, the fluid flow rate through the regulated ports 38 remains substantially constant for a given effective orifice size which is determined by the position of the stem 54 relative to the orifice 58.

In the preferred embodiment, the spool member 52 is inhibited from rotating within the bore 34. This feature is achieved by a washer-like element 140 which is clamped against a step 142 formed on the inside of the body member 12. The element is clamped in position by an end face 136 formed on the second body member 14. As seen in FIG. 2, the element defines a hexagonal shaped aperture 140. The enlarged diameter segment 72 is complementally shaped with a slightly smaller dimension so that relative sliding movement between the spool 52 and the element 130 is not inhibited. However the hexagonal cross sections of the elements prevents the spool 52 from rotating which could alter the position of the stem 54 in the spool member 52.

Although the invention has been described with a certain degree of particularity it should be understood that those skilled in the art can make various changes to it without departing from the spirit or scope of the invention as hereinafter claimed.

I claim:

1. A fluid flow regulator of the type adjustable to a desired constant flow rate comprising:
   a cartridge body defining inlet means for receiving an unregulated fluid flow, regulated outlet means through which an adjustable constant flow is discharged, and by-pass outlet means;
   a spool assembly slidably mounted within the cartridge body and having (1) a tubular spool member forming a passageway communicating with said inlet means and said regulated outlet means and (2) a stem within the spool member, said stem and spool member defining therebetween a control orifice within the passageway, said stem adjustable to any selected fixed axial position with respect to the spool member to set a fixed size of the control orifice, said spool assembly with said control orifice fixed in size being movable between a first position in which the spool member blocks the by-pass outlet means and exposes the regulated outlet means and a second position in which the spool member exposes the by-pass outlet means and blocks the regulated outlet means;
   means within the cartridge body biasing the spool assembly to said first position; and
   means secured within the cartridge body and extending to outside the cartridge body for adjusting the axial position of the stem to set the desired flow rate.

2. The flow regulator of claim 1 wherein the adjusting means comprises an internal portion within the cartridge body engaging the stem nonrotatably, said stem being axially slidable with respect to said internal portion.

3. The flow regulator of claim 2 wherein the stem is threadedly engaged to the tubular spool member.

4. The flow regulator of claim 3 wherein the stem has an end portion, said end portion of the stem and said adjusting means internal portion having complemental polygonal engagement means to provide said nonrotatable engagement.

5. The flow regulator of claim 4 wherein the spool assembly is nonrotatably mounted with respect to the cartridge body.

6. A fluid flow regulator of the type adjustable to a desired constant flow rate comprising:
   a single cartridge having inlet means, regulated outlet means, and by-pass outlet means;
   first and second coaxial interconnected members slidably mounted within the cartridge and defining therebetween an internal control orifice of adjustable fixed size, the size of said control orifice determining the constant flow rate, the relative axial positions of said first and second members being adjustable to set the size of the internal control orifice, said first and second members with said control orifice fixed in size being axially movable together within the cartridge to block and expose the two outlet means; and
   means secured within the cartridge and extending to outside the cartridge for adjusting said relative axial positions of said first and second members.

7. The flow regulator of claim 6 wherein the adjusting means comprises an internal portion within the cartridge nonrotatably engaging one of said first and second members, said one member being axially slidable with respect to said internal portion of the adjusting means.

8. The flow regulator of claim 7 wherein the first and second members are threadedly interconnected.

9. The flow regulator of claim 8 wherein said one member has an end portion, said end portion and the internal portion of said adjusting means having complemental polygonal engagement means to provide said nonrotatable engagement.

10. The flow regulator of claim 9 wherein the other of said first and second members is nonrotatably mounted with respect to the cartridge.

* * * * *